(12) United States Patent
Mathur et al.

(10) Patent No.: US 6,573,898 B1
(45) Date of Patent: Jun. 3, 2003

(54) ANALYSIS OF PROPERTIES OF EFFECTS FOR RENDERING AND CACHING OF MEDIA DATA

(75) Inventors: Shailendra Mathur, Beaconsfield (CA); Thomas P. Nadas, Montreal (CA); Daniel Desbois, Boucherville (CA)

(73) Assignee: Avid Technology, Inc., Tewksbury, MA (US)

( * ) Notice: Subject to any disclaimer, the term of this patent is extended or adjusted under 35 U.S.C. 154(b) by 95 days.

(21) Appl. No.: 09/621,269

(22) Filed: Jul. 21, 2000

(51) Int. Cl.⁷ .............................................. G06T 15/00
(52) U.S. Cl. ..................................................... 345/473
(58) Field of Search ................................ 345/419, 473, 345/474, 475, 619, 620, 629

(56) References Cited

U.S. PATENT DOCUMENTS

| | | | | |
|---|---|---|---|---|
| 5,384,912 A | | 1/1995 | Ogrinc et al. ................ | 395/164 |
| 5,995,107 A | | 11/1999 | Berteig et al. ............... | 345/420 |
| 6,034,695 A | | 3/2000 | Silva et al. .................. | 345/433 |
| 6,184,901 B1 | | 2/2001 | Silva et al. .................. | 345/474 |
| 6,262,724 B1 | * | 7/2001 | Crow et al. .................. | 345/328 |
| 6,404,435 B1 | | 6/2002 | Miller et al. ................. | 345/468 |

OTHER PUBLICATIONS

Demers, Joe, et al., "Accelerating Ray Tracing by Exploiting Frame–to–Frame Coherence", Computer Science Dept., University of So. California, USC–TR–98–668, 1998.

Neyret, Fabrice, "Modeling Animating and Rendering Complex Scenes using Volumetric Textures", IEEE Trans. Visualization Comp. Graphics, vol. 4, No. 1, Jan. 1998.

Schaufler, Gernot, "Nailboards: A Rendering Primitive for Image Caching in Dynamic Scenes", Eurographics Rendering Workshop 1997, pp. 151–162.

Shade, Jonathan, et al., "Hierarchical Image Caching for Accelerated Walkthroughs of Complex Environments", University of Washington, Microsoft Research, Technical Report UW–CSE–96–01–06, Jan. 1996, pp. 1–22.

Walter, Bruce, et al., "Interactive Rendering using the Render Cache", Proc. 10th Eurographics Workshop on Rendering, vol. 10, Jun. 1999, pp. 235–236.

Yoon, Ilmi, et al., "IBRAC: Image–Based Rendering Acceleration and Compression", Journal of High Performance Computer Graphics, Multimedia and Visualization, Jan. 2000.

Yoon, Ilmi, et al., "Accelerating Volume Visualization by Exploiting Temporal Coherence", IEEE Visualization 97 Hot Topics, Oct. 1997, pp. 21–24.

* cited by examiner

Primary Examiner—Phu K. Nguyen
(74) Attorney, Agent, or Firm—Peter J. Gordon

(57) ABSTRACT

Performance of rendering of effects on media data may be improved by analyzing properties defined for an effect to identify static and dynamic time segments within the effect. A static time segment in an effect is a time segment for which only one image is rendered. A dynamic time segment in an effect is a time segment for which each sample of media data in the time segment is rendered. An effect can contain any number of static and dynamic time segments. By identifying these time segments in an effect, processing and caching of the rendered effect are more finely grained. In particular, rendered time segments in an effect may be cached, such that a change in the effect in one time segment does not require re-rendering of other time segments. Thus, unnecessary rendering may be avoided, and invalidation of cached rendered media data and subsequent rerendering also may be reduced. In an animated effect, only one sample of media data may be rendered for a time segment in an effect if property animation and input material are both static in the time segment. If a key frame is inserted into a function curve of a property for an effect in such a way that the curve does not change, then any cached media data previously rendered for the effect need not be invalidated for the effect or for a time segment in the effect that contains this key frame. For a time segment in an effect in which properties do not change input media data in any fashion, no rendering is needed. Such a time segment may be either a static or dynamic time segment, depending on the input to the effect.

25 Claims, 6 Drawing Sheets

$$DD(E3) = f(E3.parameters, DD(E2), DD(S4))$$
$$DD(E2) = f(E2.parameters, DD(S1), DD(E1))$$
$$DD(E1) = f(E1.parameters, DD(S2), DD(S3))$$
$$DD(S4) = f(S4.filename)$$
$$DD(S3) = f(S3.filename)$$
$$DD(S2) = f(S2.filename)$$
$$DD(S1) = f(S1.filename)$$

ANALYSIS OF PROPERTIES OF EFFECTS
FOR RENDERING AND CACHING OF
MEDIA DATA

BACKGROUND

Various animation and effect systems for time-based media editing and playback systems enable users to specify complex combinations of effects to be applied to media data, such as image and audio data. Media data may be computer generated or captured from live or recorded sources, and typically is stored in a data file on a computer. With some systems, depending on the complexity of an effect, the effect may need to be rendered i.e., the effect is applied to its inputs to produce an output that is stored, to play back the output of the effect in real time.

In general, in an editing and playback system using effects, improving the performance of the system during rendering is a common problem. Algorithms may be enhanced to increase their speed, or faster computer hardware may be used to improve performance. Rendered effects commonly are cached. However, a change in an effect during editing often causes the entire effect to be re-rendered.

SUMMARY

Performance of rendering of effects on media data may be improved by analyzing properties defined for an effect to identify static and dynamic time segments within the effect. A static time segment in an effect is a time segment for which only one image is rendered. A dynamic time segment in an effect is a time segment for which each sample of media data in the time segment is rendered. An effect can contain any number of static and dynamic time segments. By identifying these time segments in an effect, processing and caching of the rendered effect are more finely grained. In particular, rendered time segments in an effect may be cached, such that a change in the effect in one time segment does not require re-rendering of other time segments. Thus, unnecessary rendering may be avoided, and invalidation of cached rendered media data and subsequent rerendering also may be reduced.

For example, in an animated effect, only one sample of media data may be rendered for a time segment in an effect if property animation and input material are both static in the time segment. If a key frame is inserted into a function curve of a property for an effect in such a way that the curve does not change, then any cached media data previously rendered for the effect need not be invalidated for the effect or for a time segment in the effect that contains this key frame. For a time segment in an effect in which properties are such that they do not change input media data, no rendering is needed. Such a time segment may be either a static or dynamic time segment, depending on the input to the effect.

Accordingly, in one aspect, a method and system for maintaining unique identifiers of cached rendered media data analyzes properties of an effect, which is applied to input media data to produce output media data, to identify any static time segments and any dynamic time segments in the effect. A unique identifier is assigned to each of the one or more time segments identified for use in caching rendered media data for the effect. The media data may be video, images, audio or other time-based media data.

In one embodiment, wherein the effect is an animation, any static time segments and any dynamic time segments may be identified by identifying where property curves and input material to the animation are static. In another embodiment, wherein the effect is a keyframed effect, any static time segments and any dynamic time segments may be identified by identifying if, after addition of a key frame, the property curve remains unchanged. In another embodiment, wherein the effect is a function that is applied to the input media data, any static time segments and any dynamic time segments may be identified by identifying conditions under which the function as applied to the input media data is an identity function.

In another embodiment, the time segment of the effect associated to each unique identifier is rendered and the rendered time segment of the effect is cached using the unique identifier. A cached rendered time segment of the effect may be retrieved using the unique identifier.

In another embodiment, the effect may be edited. Any cached rendered effect may be invalidated if a different unique identifier for the rendered effect is generated by the effect hierarchy after the editing is performed.

In another aspect, a computer program product, including a computer readable medium with instructions stored thereon, may be used by a computer to perform such a method for maintaining unique identifiers of cached rendered media data.

In another aspect, a system for maintaining unique identifiers of cached rendered media data includes a property analysis module that has an input for receiving information defining properties of an effect, which is applied to input media data to produce output media data, and an output for providing an indication identifying any static time segments and any dynamic time segments in the effect. A data descriptor generator has an input for receiving information defining an effect and an input for receiving the indication identifying the static time segments and the dynamic time segments in the effect, and has an output for providing a unique identifier to each of the one or more time segments identified for use in caching rendered media data for the effect.

DETAILED DESCRIPTION

In the following description, examples are provided using motion video data as the kind of media data on which effects are performed and for which effects are defined. It should be understood that this description is merely illustrative and that the invention is applicable to effects on any time-based media, such as image data and audio data and other time-based media.

Figures 1, 2:
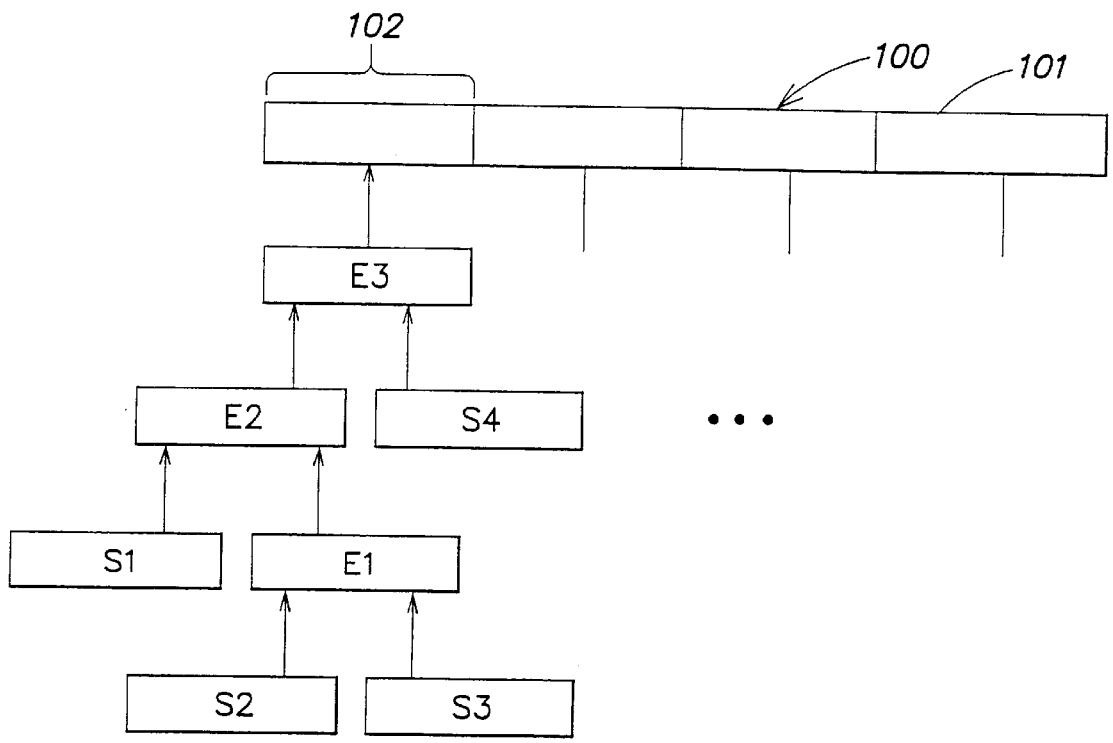
FIG. 1 is an illustration of example sequence of segments of a composition generated by a complex hierarchy of special effects.
FIG. 2 is an illustration of data descriptors used to uniquely identify the output of each of the effects in FIG. 1.

Referring now to FIG. 1, an example composition will now be described. A composition 100 generally is a combination of one or more sequences 101 of segments 102 of multimedia material. The segment 102 has a duration in time and associated media. In this example, a segment 102 is associated with media that is generated from a combination of source media by several effects. In this example, media S2 and S3 are combined by effect E1. Media S1 and the output of effect E1 are processed by effect E2. The output of effect E2 is combined with source media S4 by effect E3. The content of segment 102 is thus the output of effect E3.

There are many ways in which such a composition may be created. Several editing systems are available that allow one or more users to create one or more compositions of such media. In this example, the combination of multiple sources of media through many effects is managed using an "effect hierarchy," which may be considered a temporal data flow diagram. The output of effect E3, in this example, at each point in time in the composition, is the combination of all of the processing of the effects in the effect hierarchy applied to their respective input media at that point in time.

For each effect in an effect hierarchy, a "data descriptor" may be generated, which is a unique identifier of the output of the effect that describes all of the parameters for the effect and its inputs. A source data file also is assigned a unique identifier such as a data descriptor. How data descriptors may be generated for each effect in an effect hierarchy is described in more detail in U.S. patent application Ser. No. 5,930,797, by Raymond Hill, entitled "Method and System for Representing Hierarchical Time-Based Data Structures and to Extract Information," which is hereby incorporated by reference.

As shown in FIG. 2, a data descriptor for effect E3 is generated by a function of the parameters of effect E3, and the data descriptors of its inputs, i.e., the effect E2 and the source file S4. The data descriptor of effect E2 is generated by a function of the parameters of effect E2 and the data descriptors of its inputs, i.e., source file S1 and effect E1. The other data descriptors noted in FIG. 2 are similarly generated.

In the general case, a data descriptor is used to identify the output of an effect, for example for identifying a cached version of the rendered effect. For each effect, one or more data descriptors is produced, depending on how many static and dynamic time segments are identified in the effect. The identification of static and dynamic time segments in an effect may be performed by analyzing one or more properties of the effect and/or its input media. The identification of the such time segments enables a system to avoid unnecessary rendering, or to avoid invalidation of rendered images for an effect when changes made during editing of the composition do not result in any perceivable change to the output of the effect. Several examples of such user interaction and effects with static and dynamic time segments will be described in more detail below.

A data descriptor may be represented using any of a number of data structures. In one example, the data descriptor may be a data structure that contains a unique identifier for the effect based on its parameters and input data. In addition, a time span (in terms of duration or relative to its position in a composition) and a flag, indicating whether the data descriptor defines a static or dynamic time segment in an effect, is associated with the data descriptor. Additional information could be stored, such as an indication of whether the effect can be performed in real time. The data structure also may include information to enable caching of the data descriptor for an effect. In particular, a flag may be stored to indicate whether any parameters have been changed since the last data descriptor for the effect was generated. Also, the data descriptor may store copies of the data descriptors of its inputs. If an effect is changed, then a cached data descriptor may be used for the effect if its parameters have not been changed and if the input data descriptors have not been changed.

In prior systems, typically one data descriptor is generated for an effect. In contrast, the properties for an effect and input data are analyzed to identify time segments in the effect that are static, and other time segments that are dynamic. A data descriptor is generated for each static and dynamic time segment so identified. Thus, an effect may have two or more data descriptors defining different time segments of the output produced by the effect. Thus, if changes are made to an effect which do not impact whether a time segment is static or dynamic, unnecessary re-rendering of material or rendering of material may be avoided. Several examples of such effects will be described in more detail below.

Figure 3:
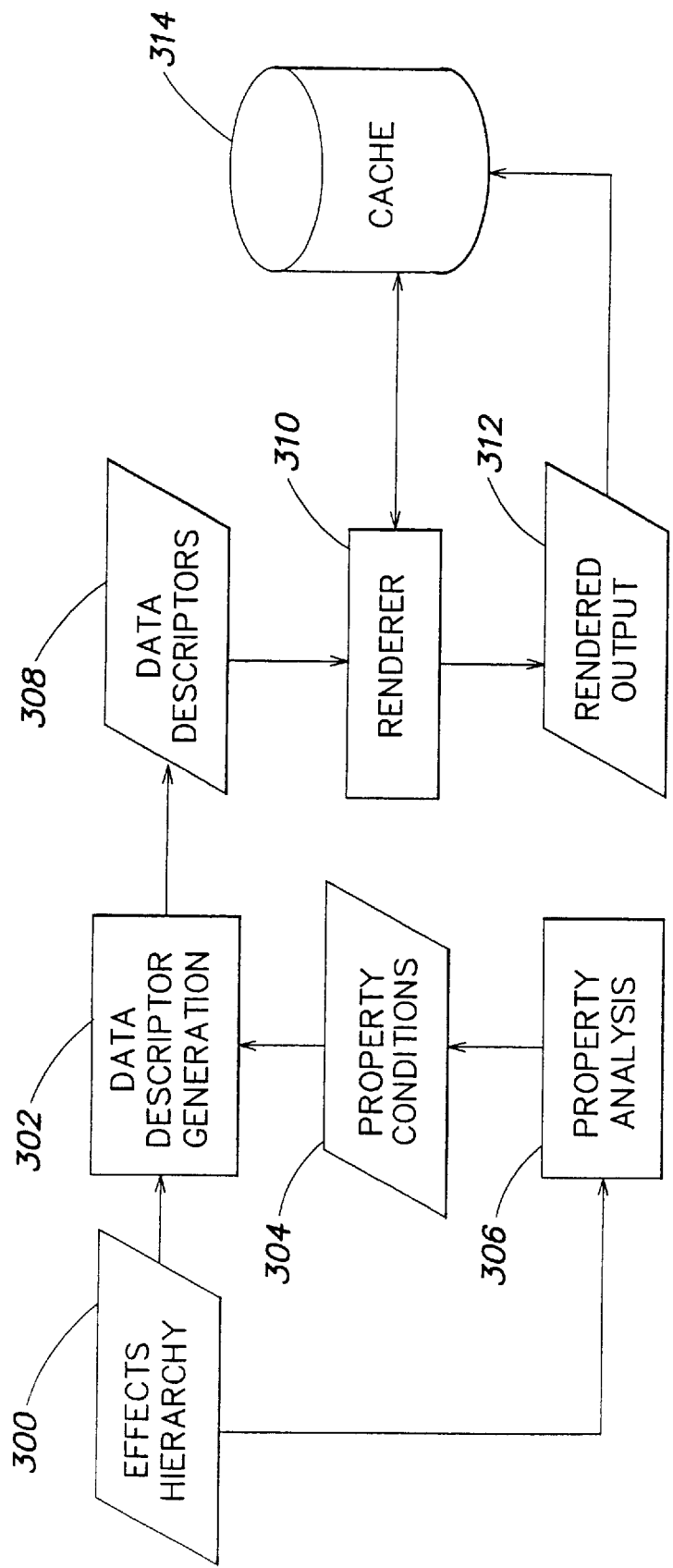
FIG. 3 is a data flow diagram illustrating how property analysis may be used in one embodiment.

Referring now to FIG. 3, a data flow diagram of a system that uses property analysis to generate data descriptors of time segments of an effect will now be described. In FIG. 3, an effects hierarchy 300 is provided to data descriptor generation 302 which uses property conditions 304 resulting from property analysis 306 on the effects hierarchy 300 to generate the data descriptors for each of the effects, as indicated at 308. The property analysis 306 identifies one or more time segments in each effect that are either static or dynamic. This property analysis and data descriptor generation may be invoked each time an editing operation performed by an operator results in a change in the effects hierarchy or in the one or more properties of an effect. Examples of property analysis will be described in more detail below. The data descriptors are then used by a renderer 310 to determine whether rendered output 312 is already available in a cache 314. A system for such caching is described in "System, Apparatus and Method for Managing the Use and Storage of Digital Information," by James Zamiska, et al., Ser. No. 08/942,551, filed Apr. 15, 1997, which is hereby incorporated by reference. If the renderer needs to produce the rendered output instead of retrieving it from a cache, the rendered output 312 then may be stored in the cache 314. For a static time segment, only one image is rendered for the time segment. For a dynamic time segment, each image for the time segment is rendered.

Figure 4:
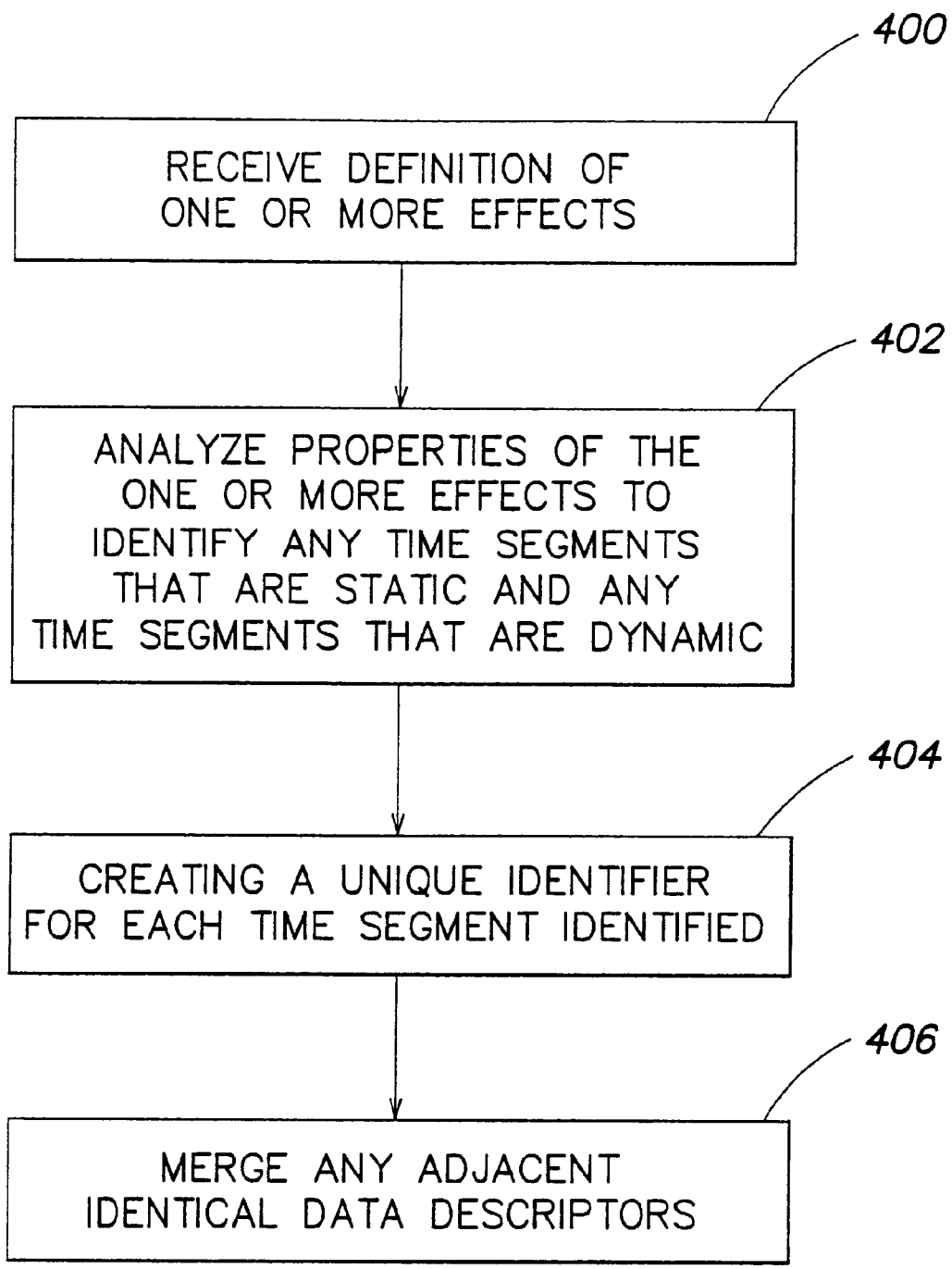
FIG. 4 is a flow chart describing an embodiment of property analysis.

Referring now to FIG. 4, a flow chart describing how data descriptors are generated will now be described. First, the definition of one or more effects is received 400. For each effect, the properties are then analyzed in step 402 to identify any time segments that are static and any time segments that are dynamic. For example, a time segment in which property animation and input material are static in an animated effect is a static segment. As another example, if a key frame is inserted in a function curve for a property for an effect in such a way that the curve does not change, the data descriptor remains the same. As a result, any cache of a previously rendered image or sequence of images for that time segment of the effect would not be invalidated. A time segment in an effect in which the effect properties do not change any input media does not require rendering and may be considered a bypassed time segment. That is, the data descriptor of the input may be directly passed through to be the data descriptor of the output of the effect. In such a case, the function applied to the input media data by the effect may be considered an identity function.

For each identified time segment, a unique identifier, or a data descriptor, is created. Step 404. Next, data descriptors for adjacent time segments in the effect are compared. Any adjacent identical data descriptors are merged in step 406 into a single descriptor, for example by deleting the second descriptor and adding its time duration to the first data descriptor.

Figure 5:
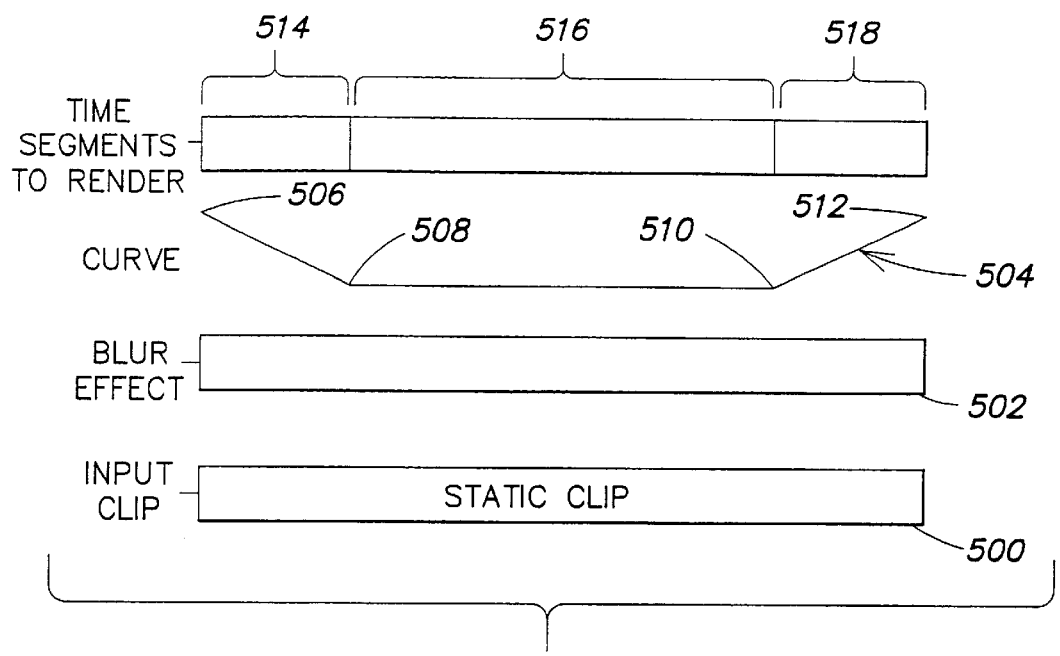
FIG. 5 is an illustration explaining an example effect.

Referring now to FIG. 5, an example of an effect having static and dynamic time segments will now be described. An input clip 500, indicated as a static clip, has a blur effect, indicated at 502, applied to it. The blur effect is defined by a property curve 504 which indicates that from time 506 to 508, the radius of the blur is decreasing. From time 508 to 510, the radius is constant, and from time 510 to time 512, the radius of the blur is increasing. As a result, time segment 514 is dynamic, time segment 516 is static, and time segment 518 also is dynamic. This example indicates that for animated effects, if a property curve and input material are static, then a static time segment is defined and only one image is rendered for that time segment.

Figure 6:
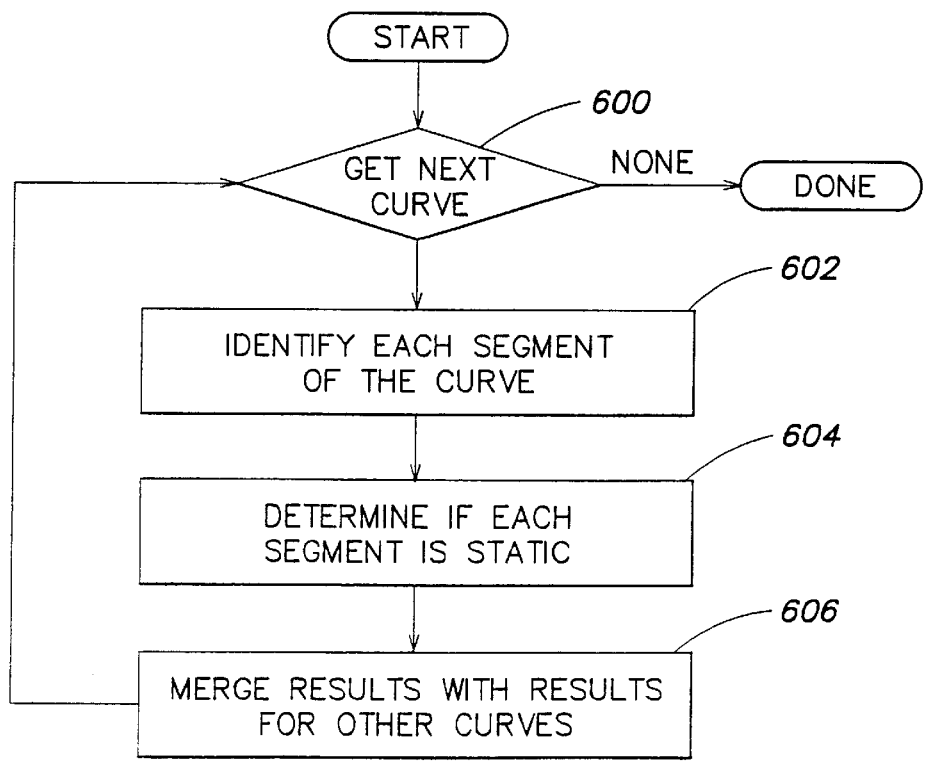
FIG. 6 is a flow chart describing how the effect in FIG. 5 may be analyzed.

Referring now to FIG. 6, a flow chart describing property analysis for this example will now be described. It should be understood that an effect may have several property curves to be processed. Assuming that the input material is static, any next curve to be analyzed is obtained in step 600. Each time segment of the property curve is then identified in step 602. A time segment of a curve may be identified in any of a number of ways. For example, a time segment may be defined by two key frames. For each identified time segment of the curve, it is determined whether that time segment is static. Step 604. Such a condition may be identified if, for example, the values of the property at two keys bounding the time segment are equal. Also, for curves defined as Bezier curves, for example, if the angle of the right tangent of the left key frame and the left tangent of the right key frame are 0, then the time segment is static. Such analysis may be applied to any type of function curve. After the static time segments are identified, the results are merged with the results for other curves in step 606. In particular, if one curve is dynamic in one time segment and another curve is static in that time segment, that time segment is dynamic. Only those time segments in which all of the curves are static are static time segments of the effect. After the results for a curve are merged with prior results, the next curve is examined in step 600. If no curves remain to be examined, this process is completed. Adjacent static time segments and adjacent dynamic time segments also may be merged after their data descriptors are created.

Figure 7:
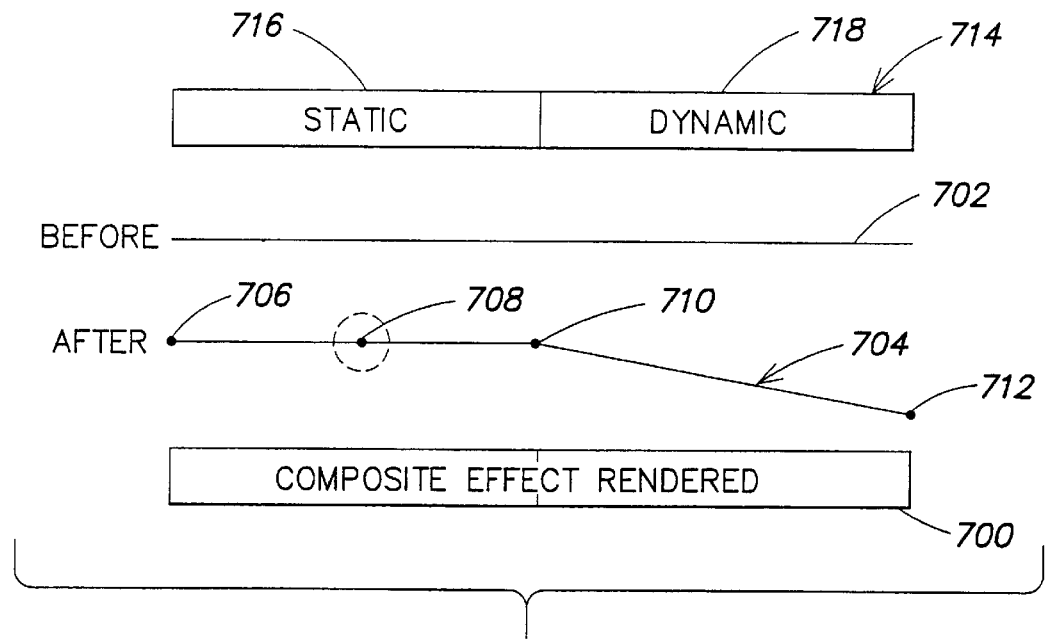
FIG. 7 is an illustration explaining an example key framed effect.

Another example effect is shown in FIG. 7. In this effect, assume that a rendered composite effect exists, as indicated as 700. The effect includes a definition of opacity as indicated at 702. A user then inserts a number of key frames as indicated at 704 including key frames 706, 710 and 712. As a result, the opacity now changes from key frame 710 to key frame 712. The time segments, as indicated at 714, are static at 716 and dynamic at 718 where the change in the opacity was made. In this case, any cached images should be invalidated only for the time segment where the opacity actually changes. There is no reason to invalidate the cached rendered composite effect for the static regions 716. The insertion of the key 708 does not change the shape of the property curve.

Figure 8:
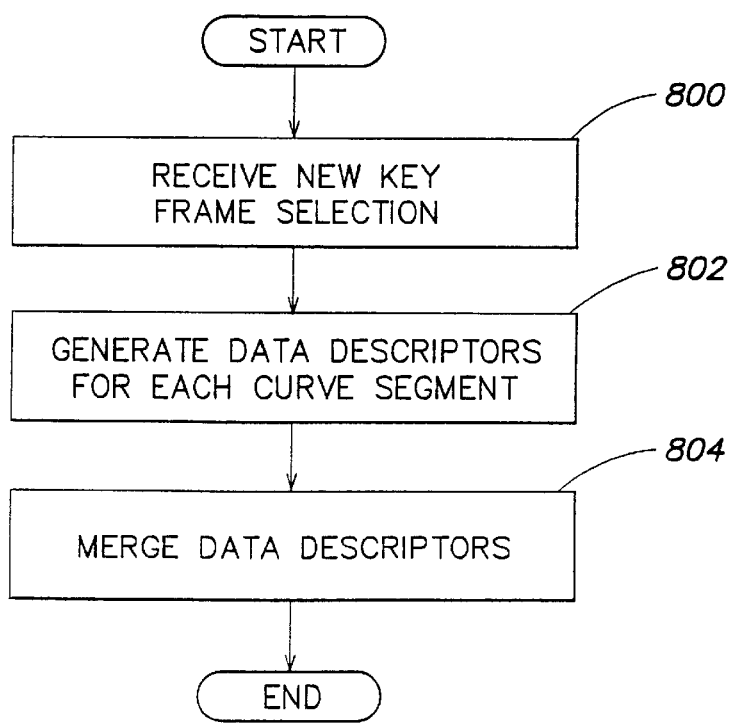
FIG. 8 is a flow chart describing how the key framed effect in FIG. 7 may be analyzed.

How the data descriptors are generated after the insertion of key frame 708 so as not to invalidate cached rendered material will now be described in connection with FIG. 8. First, an indication of a new key frame being added to the property curve is received in step 800. Data descriptors for each time segment of the effect are then generated in step 802. These data descriptors are then merged in step 804, such that any adjacent identical data descriptors are combined into a single data descriptor. With this process, the insertion of a key frame at 708 would result in no change in the data descriptors for the static time segment at the beginning of the composite effect. The process set forth in FIG. 6 may be used to generate a data descriptors for each curve segment.

Figure 9:
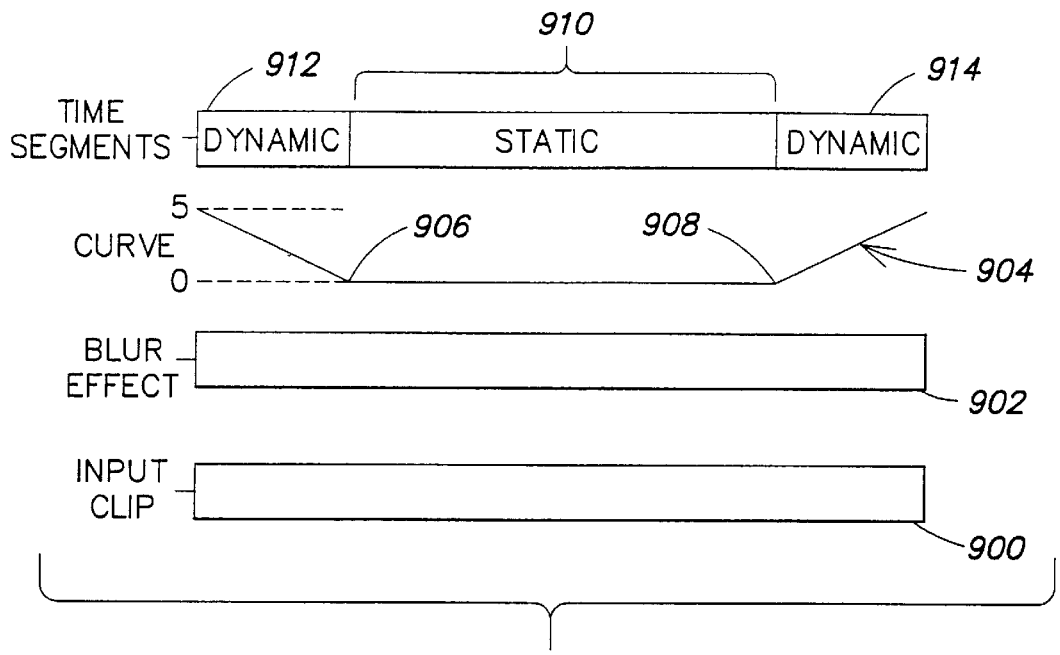
FIG. 9 is an illustration explaining an example effect.

Another example effect is shown in FIG. 9. In this example, an input clip 900, either static or dynamic, is blurred by a blur effect 902 for which the blur is specified by a curve, indicated at 904. In this example, the bottom of the curve specifies a blur of radius 0 and the top of the curve specifies a blur of radius 5. In the curve, from point 906 to point 908, the blur radius of 0 does not change the input media. Thus, in this example, the effect properties do not change the input media. Thus, no rendering is performed for the time segment where no change to the input media is made. Thus, time segment 910 is a bypassed time segment, and is either static or dynamic depending on input clip 900, and time segments 912 and 914 are dynamic segments. Thus, in this example, the data descriptor of time segment 910 is the same as the data descriptor of input clip 900, but has a time span of the time segment 910, not of input clip 900.

Figure 10:
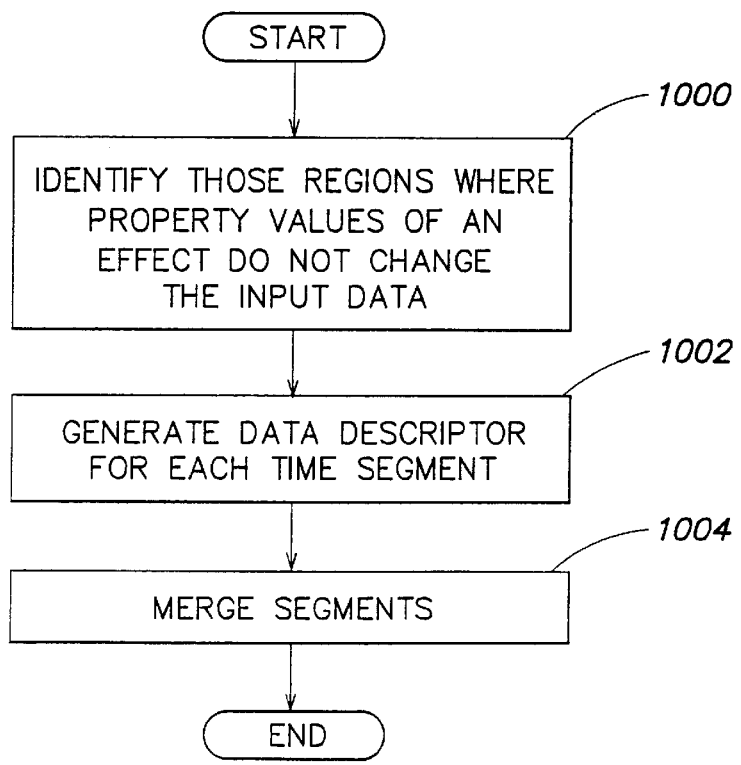
FIG. 10 is a flow chart describing how the effect of FIG. 9 may be analyzed.

Referring now to FIG. 10, a flow chart describing how such analysis is performed will now be described. In one embodiment each effect may be defined as an object in an object oriented programming language and may include a method that evaluates if its properties change input data for a given set of values. Other mechanisms may be used to determine whether any property of an effect changes the input data. Thus, given a value, or a sequence of values, for one or more properties the effect may determine whether that value or any value in the sequence of values would change the input media. Thus, when generating one or more data descriptors for an effect, the property curve for the effect is processed to identify those bypass time segments in which no property changes the input data in step 1000. A data descriptor is then generated for each time segment in step 1002. For a bypass time segment, the data descriptor is the data descriptor of the input to the effect, and the time span is the time span of the bypass time segment. The identified time segments then may be merged if any adjacent time segments are identical in step 1004.

As can be seen from the foregoing examples, the identification of static and dynamic time segments enables identification of time segments in an effect that need to be rendered after editing. The identified time segments may be used to generate a graphical user interface element that displays whether a time segment needs to be rendered before playback.

This process of identifying static and dynamic time segments within a data descriptor also refines the granularity with which the effects are defined, rendered and cached. This refined granularity improves performance of rendering and caching by avoiding rendering where unnecessary, and avoiding re-rendering when appropriate rendered image data is already in a cache.

It should be understood that there are many different ways to identify the static and dynamic time segments in an effect and that the invention is not limited to those examples shown herein. For example, although the example in FIG. 7 illustrates adding a key frame in a constant valued curve, the same principal could be applied to a dynamic time segment so that insertion of a key frame results in only one dynamic time segment being generated without invalidation of a cached rendered version of the effect after insertion of the key frame.

In general, any effect that is applied to time-based media data may be considered a function that is defined by properties that may vary over time. Any other technique may be used to identify time segments of such a function in which the property is constant or in which the property does not change the input data.

It should be understood that the foregoing examples directed to video data are not limiting. The present invention is applicable to all types of time-based media data, such as audio. Effects on time-based media are divided into one or more time segments, such that a time segments is designated as either static or dynamic. Using a unique identifier for each time segment to cache the rendered effect applied to the input media data reduces rendering and rerendering of the effect, or time segments in the effect, during editing.

A computer system with which the various elements of the embodiments described above, either individually or in combination, may be implemented typically includes at least one main unit connected to both one or more output devices which store information, transmit information or display information to one or more users or machines and one or more input devices which receives input from one or more users or machines. The main unit may include one or more processors connected to a memory system via one or more interconnection mechanisms, such as a bus or switch. Any input device and output device also are connected to the processor and memory system via the interconnection mechanism.

The computer system may be a general purpose computer system which is programmable using a computer programming language. Computer programming languages suitable for implementing such a system include procedural programming languages, object-oriented programming languages, combinations of the two, or other languages. The computer system may also be specially programmed, special purpose hardware, or an application specific integrated circuit (ASIC).

In a general purpose computer system, the processor is typically a commercially available processor which executes a program called an operating system which controls the execution of other computer programs and provides scheduling, debugging, input/output control, accounting, compilation, storage assignment, data management and memory management, and communication control and related services. The processor and operating system defines computer platform for which application programs in other computer programming languages are written. The invention is not limited to any particular processor, operating system or programming language.

A memory system typically includes a computer readable and writeable nonvolatile recording medium in which signals are stored that define a program to be executed by the processor or information stored on the disk to be processed by the program. Typically, in operation, the processor causes data to be read from the nonvolatile recording medium into another memory that allows for faster access to the information by the processor than does the disk. This memory is typically a volatile, random access memory such as a dynamic random access memory (DRAM) or static memory (SRAM). The processor generally manipulates the data within the integrated circuit memory and then copies the data to the disk after processing is completed. A variety of mechanisms are known for managing data movement between the disk and the integrated circuit memory element, and the invention is not limited thereto. The invention is not limited to a particular memory system.

Such a system may be implemented in software or hardware or firmware, or any combination thereof. The various elements of the system of FIG. 1, either individually or in combination, may be implemented as a computer program product including a computer-readable medium on which instructions are stored for access and execution by a processor. When executed by the computer, the instructions instruct the computer to perform the various steps of the process.

Having now described a few embodiments, it should be apparent that the foregoing is merely illustrative and not limiting, having been presented by way of example only. Numerous modifications and other embodiments are within the scope of one of ordinary skill in the art.

What is claimed is:

1. A method for maintaining unique identifiers of cached rendered media data, comprising:
    analyzing properties of an effect, which is applied to input media data to produce output media data, to identify any static time segments and any dynamic time segments in the effect; and
    assigning a unique identifier to each of the one or more time segments identified for use in caching rendered media data for the effect.

2. The method of claim 1, wherein the effect is an animation, and wherein identifying any static time segments and any dynamic time segments comprises identifying where property curves and input material to the animation are static.

3. The method of claim 1, wherein the effect is a key-framed effect, and wherein identifying any static time segments and any dynamic time segments comprises identifying if, after addition of a key frame, the property curve remains unchanged.

4. The method of claim 1, wherein the effect is a function that is applied to the input media data, wherein identifying any static time segments and any dynamic time segments comprises identifying conditions under which the function as applied to the input media data is an identity function.

5. The method of claim 1, further comprising rendering the time segment of the effect associated to each unique identifier and caching the rendered time segment of the effect using the unique identifier.

6. The method of claim 1, further comprising editing the effect, and, invalidating a cached rendered effect if a unique identifier for the rendered effect no longer is generated by the effect hierarchy after the editing is performed.

7. The method of claim 1, further comprising retrieving a cached rendered time segment of the effect using the unique identifier.

8. The method of claim 1, wherein the media data is image data.

9. A system for maintaining unique identifiers of cached rendered media data, comprising:
    means for analyzing properties of an effect, which is applied to input media data to produce output media data, to identify any static time segments and any dynamic time segments in the effect; and
    means for assigning a unique identifier to each of the one or more time segments identified for use in caching rendered media data for the effect.

10. The system of claim 9, wherein the effect is an animation, and wherein the means for identifying any static time segments and any dynamic time segments comprises means for identifying where property curves and input material to the animation are static.

11. The system of claim 9, wherein the effect is a keyframed effect, and wherein the means for identifying any static time segments and any dynamic time segments comprises means for identifying if, after addition of a key frame, the property curve remains unchanged.

12. The system of claim 9, wherein the effect is a function that is applied to the input media data, wherein the means for identifying any static time segments and any dynamic time segments comprises means for identifying conditions under which the function as applied to the input media data is an identity function.

13. The system of claim 9, further comprising:

means for rendering the time segment of the effect associated to each unique identifier; and means for caching the rendered time segment of the effect using the unique identifier.

14. The system of claim 9, further comprising means for editing the effect, and, for invalidating a cached rendered effect if a unique identifier for the rendered effect no longer is generated after editing is performed.

15. The system of claim 9, further comprising means for retrieving a cached rendered time segment of the effect using the unique identifier.

16. The system of claim 9, wherein the media data is image data.

17. A computer program product, comprising:

a computer readable medium, instructions stored on the computer readable medium that when executed by a computer instruct the computer to perform a method for maintaining unique identifiers of cached rendered media data, comprising:

analyzing properties of an effect, which is applied to input media data to produce output media data, to identify any static time segments and any dynamic time segments in the effect; and assigning a unique identifier to each of the one or more time segments identified for use in caching rendered media data for the effect.

18. The computer program product of claim 17, wherein the effect is an animation, and wherein identifying any static time segments and any dynamic time segments comprises identifying where property curves and input material to the animation are static.

19. The computer program product of claim 17, wherein the effect is a keyframed effect, and wherein identifying any static time segments and any dynamic time segments comprises identifying if, after addition of a key frame, the property curve remains unchanged.

20. The computer program product of claim 17, wherein the effect is a function that is applied to the input media data, wherein identifying any static time segments and any dynamic time segments comprises identifying conditions under which the function as applied to the input media data is an identity function.

21. The computer program product of claim 17, further comprising rendering the time segment of the effect associated to each unique identifier and caching the rendered time segment of the effect using the unique identifier.

22. The computer program product of claim 17, further comprising editing the effect, and, invalidating a cached rendered effect if a unique identifier for the rendered effect no longer is generated by the effect hierarchy after the editing is performed.

23. The computer program product of claim 17, further comprising retrieving a cached rendered time segment of the effect using the unique identifier.

24. The computer program product of claim 17, wherein the media data is image data.

25. A system for maintaining unique identifiers of cached rendered media data, comprising:

a property analysis module having an input for receiving information defining properties of an effect, which is applied to input media data to produce output media data, and an output for providing an indication identifying any static time segments and any dynamic time segments in the effect; and a data descriptor generator having an input for receiving information defining an effect and an input for receiving the indication identifying the static time segments and the dynamic time segments in the effect, and having an output for providing a unique identifier to each of the one or more time segments identified for use in caching rendered media data for the effect.

* * * * *